Patented Oct. 24, 1950

2,527,320

UNITED STATES PATENT OFFICE 2,527,320

DEHYDRATION OF ALKALI-METAL ACID FLUORIDES

Robert C. McHarness and Anthony F. Benning, Woodstown, N. J., assignors to the United States of America as represented by the United States Atomic Energy Commission No Drawing. Application October 14, 1944, Serial No. 558,738

3 Claims. (Cl. 202—39)

This invention relates to the dehydration of alkali-metal acid fluoride compositions and particularly alkali-metal acid fluorides of the type employed as electrolytes for the electrolytic production of fluorine.

In the electrolytic manufacture of fluorine various compositions of an alkali-metal fluoride and hydrogen fluoride are employed from about an equimolar mixture to mixtures containing three or more mols of hydrogen fluoride, HF, for each mol of alkali-metal-fluoride, MeF, Me representing alkali-metal, based on a molecular weight of 20 for hydrogen fluoride. Examples of such electrolytes are potassium acid fluorides, containing about two mols of HF for each mol of KF, to which between 2% and 3% of sodium fluoride or lithium fluoride may be added to improve their operating characteristics. The presence of water in the electrolyte interferes seriously with the electrolysis, particularly when carbon anodes are employed.

It is an object of the present invention to provide a process which effectively removes water from such compositions.

In accordance with the present invention a water-containing composition is prepared comprising an alkali-metal fluoride and hydrogen fluoride, in a ratio of HF to alkali-metal fluoride in excess of an equimolar ratio, and less than 10% by weight of water, and sufficient hydrogen fluoride is distilled off from the composition to carry off substantially all of the water.

We have found that despite the relatively high boiling point of water compared with that of hydrogen fluoride the hydrogen fluoride distilled from such compositions contains a substantially higher proportion of water than is present in the original composition. By taking advantage of this property, we are able to remove substantially all of the water by distilling off only a portion of the hydrogen fluoride present.

The dehydration may be carried to any desired degree by merely providing the required initial quantity of hydrogen fluoride. If desired, anhydrous hydrogen fluoride can be added in increments, a small proportion being added first and distilled off, and a second small proportion being added to remove remaining traces of moisture.

The customary methods of preparing the electrolyte may produce a composition containing on the order of 0.02% to 1.00% of water. While this is a very low proportion of the electrolyte, it is enough to interfere seriously with the production of fluorine in carbon anode cells. By providing a composition containing about two mols of hydrogen fluoride for each mol of alkali-metal fluoride and distilling off hydrogen fluoride at atmospheric pressure, the water contained in the electrolyte may be selectively distilled so that before the HF content of the electrolyte approaches 50 mol per cent the water content of the electrolyte has been reduced to not more than a few thousandths of one per cent. The procedure is not limited to the removal of such small quantities of water but is effective for larger quantities since the greater the proportion of water, the more rapidly it is evolved. By distillation of less than a molecular proportion of hydrogen fluoride as described, amounts of water up to 10% of the composition can be removed substantially completely.

Example 1455 grams of potassium acid fluoride of composition: $KF.2HF$, containing about 0.034% of water were heated in a copper flask over a graphite bath to distill off hydrogen fluoride at atmospheric pressure. The condensate was collected and its water content determined by electrical conductivity measurements. The first 60 grams of hydrogen fluoride condensate were found to contain over 95% of the water originally present in the electrolyte. The distillation was continued and when 171 grams of hydrogen fluoride had collected, the 0.034% of water in the electrolyte had been removed within the limits of experimental error, leaving a substantially anhydrous potassium acid fluoride.

It will be understood that we intend to include variations and modifications of the invention and that the preceding example is an illustration only and in no wise to be construed as a limitation upon the invention, the scope of which is defined in the appended claims, wherein we claim:

1. The method for dehydrating a potassium acid fluoride containing up to 10% of water, which comprises providing a hydrogen fluoride content in the acid fluoride substantially in excess of an equimolar ratio of HF to KF and distilling off a portion of the hydrogen fluoride present, but not more than required to leave an equimolar ratio in the distillation residue, so as to remove substantially all of the water from the acid salt residue.

2. The method for preparing a potassium acid fluoride electrolyte for use in the manufacture of fluorine by electrolysis from a potassium acid fluoride containing between 0.02% and 1.00% of water, which comprises providing a hydrogen fluoride content in the acid fluoride substantially in excess of an equimolar ratio of HF to KF and distilling off a portion of the hydrogen fluoride present, but not more than required to leave an equimolar ratio in the distillation residue, so as to remove substantially all of the water from the acid salt residue.

3. The method for dehydrating a potassium acid fluoride containing up to 10% water which comprises the steps of providing a hydrogen fluoride content in the acid fluoride substantially in excess of an equimolar ratio of HF to KF and distilling off a portion of the hydrogen fluoride present, but not more than required to leave an equimolar ratio in the distillation residue, and repeating said steps, so as to remove substantially all of the water from the acid salt residues.

ROBERT C. McHARNESS.
ANTHONY F. BENNING.

REFERENCES CITED

The following references are of record in the file of this patent:

UNITED STATES PATENTS

| Number | Name | Date |
|---|---|---|
| 1,914,425 | Henglein | June 20, 1933 |
| 1,927,108 | Zimmerman | Sept. 13, 1933 |
| 2,018,397 | Calcott | Oct. 22, 1935 |
| 2,088,048 | Bishop | July 27, 1937 |

FOREIGN PATENTS

| Number | Country | Date |
|---|---|---|
| 335,703 | Great Britain | Oct. 2, 1930 |

OTHER REFERENCES

"Transactions of The American Electrochemical Society," vol. XXXV, 1919, Argo et al., pp. 340–345. Copy in Div. 56.